United States Patent [19]

McGuire et al.

[11] Patent Number: 5,040,482
[45] Date of Patent: Aug. 20, 1991

[54] PAINT SPRAY BOOTH

[75] Inventors: Thomas K. McGuire, Southfield; Andrew J. Gladd, Plymouth, both of Mich.

[73] Assignee: Giffin, Inc., Farmington, Mich.

[21] Appl. No.: 430,281

[22] Filed: Nov. 2, 1989

[51] Int. Cl.⁵ .................. B05B 15/04; B05B 15/12
[52] U.S. Cl. .................. 118/326; 55/DIG. 46; 55/240
[58] Field of Search .................. 118/326; 55/240, 246, 55/DIG. 46, 247; 210/305

[56] References Cited

U.S. PATENT DOCUMENTS

| | | | |
|---|---|---|---|
| 3,172,725 | 3/1965 | Rugh et al. | 55/240 |
| 3,884,654 | 5/1975 | de Crevoisier et al. | 55/240 |
| 4,400,274 | 8/1983 | Protos | 210/305 |
| 4,537,120 | 8/1985 | Josefsson | 55/DIG. 46 |
| 4,951,600 | 8/1990 | Soshi et al. | 118/326 |

Primary Examiner—Richard Bueker
Assistant Examiner—George A. Goudreau
Attorney, Agent, or Firm—Harness, Dickey & Pierce

[57] ABSTRACT

A paint spray booth for painting articles is disclosed having a liquid wash scrubber beneath an upper chamber for removing the overspray paint particles from the air by intermixing the paint latent air with a liquid such as water. The scrubber forms a substantially horizontal water and air flow path to reduce the vertical height of the scrubber and therefore reduce the vertical height of the overall spray booth. The scrubber forms a trough extending longitudinally through the booth having a liquid flow exit from the bottom of the trough laterally from the bottom of the trough. Downstream from the trough, a baffle blocks the flow of the liquid forming a liquid trap to create turbulence in the liquid flowing through the scrubber to intermix the liquid with the paint latent air.

11 Claims, 2 Drawing Sheets

PAINT SPRAY BOOTH

BACKGROUND AND SUMMARY OF THE INVENTION

The present invention relates generally to a paint spray booth for spray painting articles and in particular to a fluid wash scrubber for capture of overspray paint particles in a paint spray booth.

Paint spray booths, particularly for use in production of larger articles such as automobile bodies, comprise a housing through which the article to be painted is moved longitudinally on a conveyor. The paint can be applied automatically by robots or the paint can be applied manually. With either method of application, there is a certain amount of paint which does not contact the target object and forms airborne overspray within the spray booth atmosphere. It is necessary to provide ventilation to remove the overspray from the paint booth to maintain the booth in proper condition and to provide a clean atmosphere for workers in the booth.

Air is typically blown through the spray booth in one direction to remove the overspray from the spray booth atmosphere. After the overspray has been removed from the spray booth, it is necessary to remove the overspray paint particles from the ventilation air before either recirculating the air or exhausting the air to the environment. One way to remove the overspray paint particles from the air is with a liquid wash scrubber which entraps the paint particles within a liquid, typically water, after which the paint is separated from the liquid for proper disposal.

In many prior art spray booths of the so called downdraft type the paint laden air and water flow downwardly through a grid on the floor of the booth into a scrubber in which the water and paint laden air are thoroughly intermixed and agitated to enable the paint particles to be entrapped in the water. Although prior art scrubbers for downdraft paint booths operate generally satisfactorily, there is a continuing need to enhance their performance in removing airborne paint and further to reduce their vertical height which affects the overall height of the spray booth.

It is an object of the present invention therefore, to provide a fluid wash scrubber for a paint booth in which the vertical height of the scrubber is minimized to reduce the overall height of the booth. It is a feature of the present invention to provide a liquid wash scrubber in which the air and liquid intermix in a substantially horizontal flow direction to reduce the scrubber height. It is a further object of this invention to reduce overspray paint emissions from the spray booth.

The paint spray booth of the present invention comprises a housing having a base and an intermediate horizontal floor spaced above the base dividing the housing into an upper chamber and a lower chamber. Objects to the painted are conveyed longitudinally through the upper chamber in a conventional manner. The horizontal intermediate floor is a grated floor which allows ventilation air to flow through the floor. The spray booth of the present invention includes downdraft ventilation in which air is blown into the spray booth from the ceiling of the booth and directed downward.

The downwardly flowing air removes overspray paint particles from the upper chamber and carries these particles through the grated floor to the lower chamber which contains the liquid wash scrubber. In the scrubber, the air is mixed with liquid, typically water, which entraps the paint overspray particles to remove the paint particles from the air to purify the air. The scrubber provides a flow path for the air and water in which the mixture flows downwardly, then laterally through an orifice, and then upwardly over a baffle. The flow path through the scrubber creates turbulence in the water to ensure complete mixing of the water and air in the scrubber. The lower chamber includes an air exhaust vent along one lateral side of the scrubber which is positioned in the side of the lower chamber opposite the direction of the water flow path through the scrubber. This results in the air in the scrubber being drawn through the water to further ensure complete removal of paint from the water. By providing a substantially horizontal flow path for the water and air through the scrubber, the overall height of the scrubber and the lower chamber can be reduced to enable a reduction in the overall height of the spray booth.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
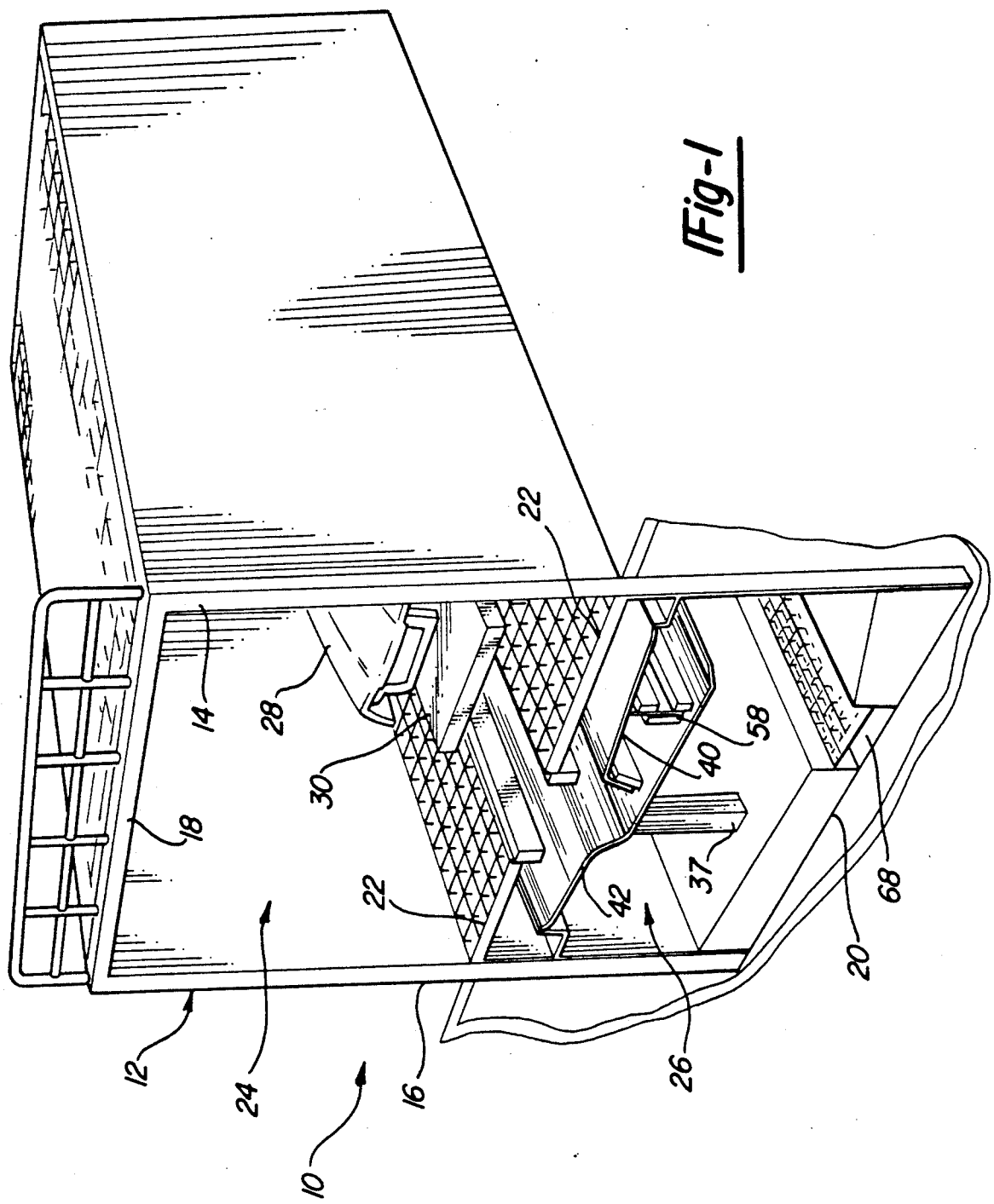
FIG. 1 is a perspective view of the spray booth of the present invention showing the liquid wash scrubber.
Figure 2:
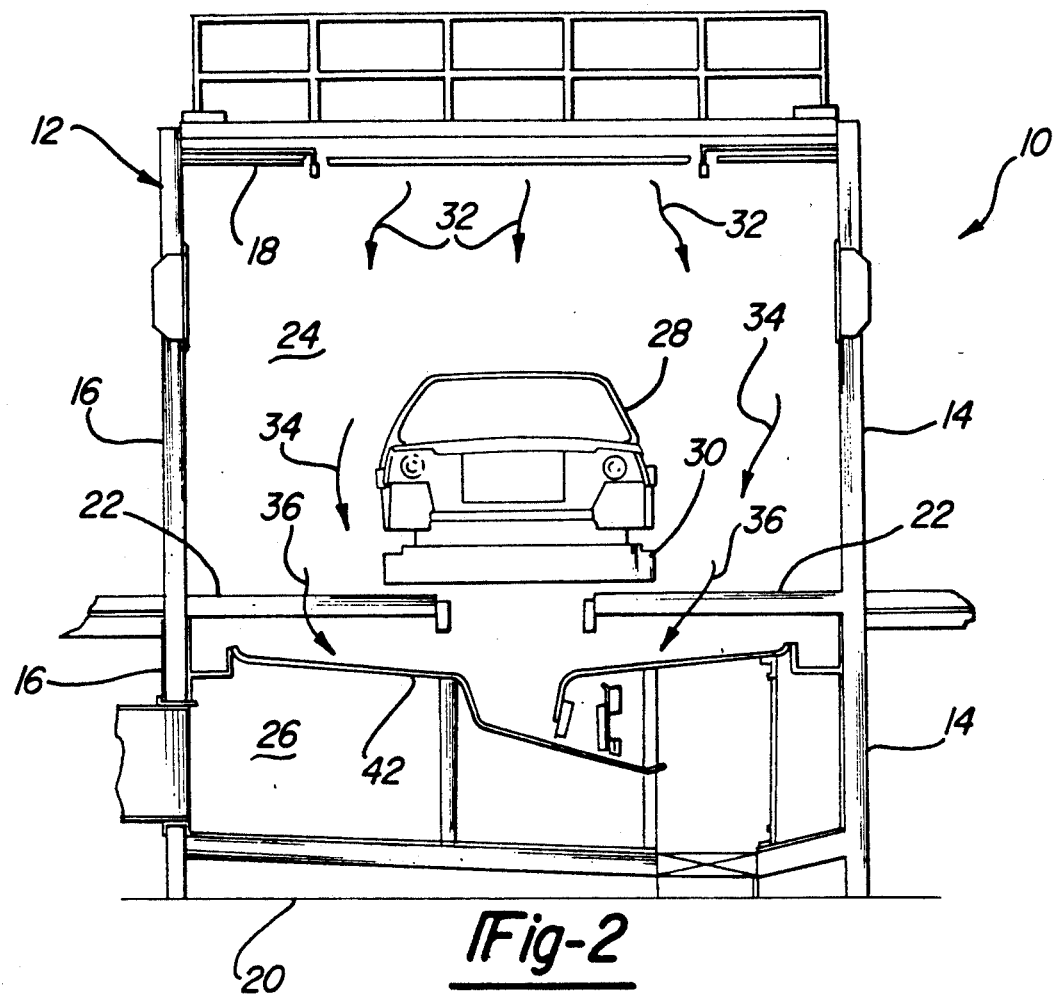
FIG. 2 is an end view of the spray booth shown in FIG. 1.
Figure 3:
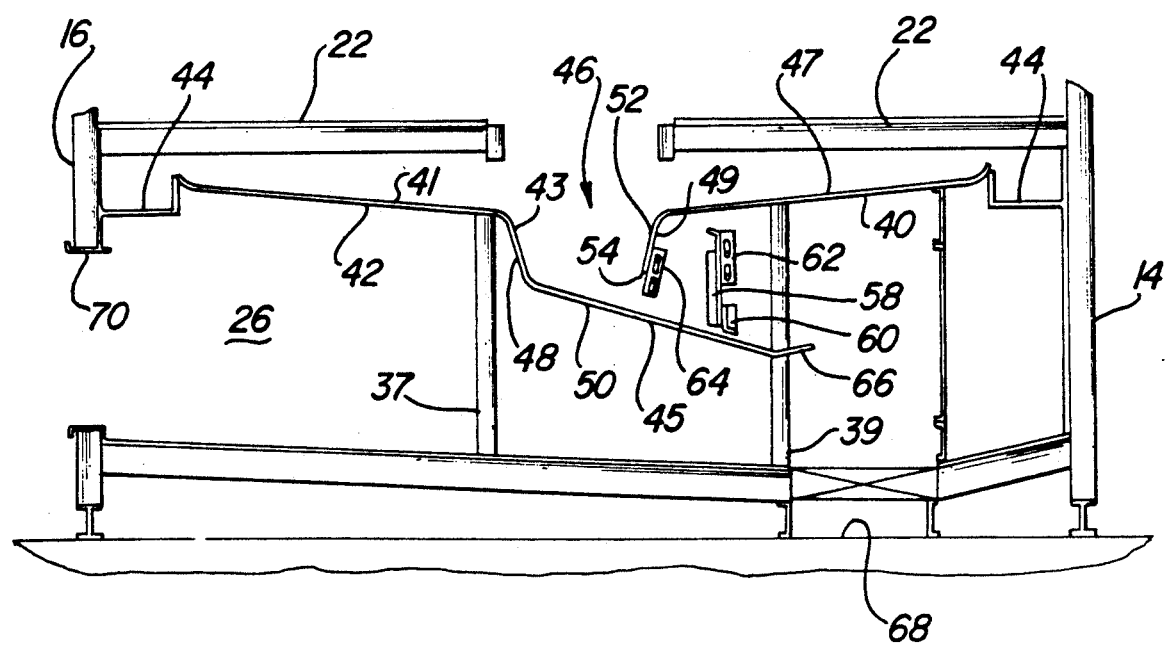
FIG. 3 is an enlarged end view of the lower portion of the spray booth illustrating the liquid wash scrubber.

The spray booth of the present invention is shown in FIG. 1 and designated generally as 10. The spray booth comprises a housing 12 which is formed by sidewalls 14 and 16, ceiling 18 and bottom base 20. An intermediate horizontal floor 22 divides the housing 12 into an upper chamber 24 and a lower chamber 26. Articles to be painted, such as automobile body 28, are moved longitudinally through the housing 12 by a conveyor 30 in a conventional manner. The automobile body 28 is painted while being conveyed through the upper chamber 24 by either computer controlled spray paint equipment or by manually operated painting equipment.

Regardless of whether the paint is applied automatically or manually, there will be a certain amount of paint overspray, paint particles which do not contact the target object and become airborne. The overspray paint particles must be removed from the upper chamber 24. The overspray paint particles are removed by creating downflow ventilation within the chamber 24 to continuously move the air in the upper chamber downward through the grates in the horizontal floor 22. Ventilation equipment (not shown) above the ceiling 18 provides downward flowing air shown by arrows 32, 34 and 36.

A liquid wash scrubber is located within the lower chamber 26 to remove the overspray paint particles from the air flowing downward through the horizontal floor 22. The scrubber uses a liquid, such as water (typically with cleaning agents added), to intermix with the air to entrap the paint particles in the water, thereby purifying the air. The purified air is then either exhausted to atmosphere or is returned through the ventilation equipment to the upper chamber 24. The paint laden water is collected and conveyed to a sludge or water filtration system to remove the paint from the water for proper disposal of the paint. Once the paint has been removed from the water, the water is either returned to the scrubber or discharged.

The scrubber is designed to provide a surface of water extending lateral between the two sidewalls 14 and 16 into which the air from the upper chamber is blown. The scrubber forms a generally horizontal flow path for the water and air through the scrubber so as to intermix the water with the paint laden air. The scrubber includes two panels 40 and 42, which extend longitudinally through the lower chamber 26. The panels are inclined inwardly and downwardly from water supply troughs 44 positioned along each sidewall 14 and 16 and are supported by vertical columns 37 and 39.

The panels 40 and 42 are configured so as to form a trough 46 longitudinally extending through the center of the lower chamber 26. Panel 42 extends laterally from the trough 44 along sidewall 16. The panel 42 includes an upper portion 41 which is inclined downwardly toward approximately the center of the lower chamber. Panel 42 is then curved downward forming an intermediate portion 43 which forms a side 48 of the trough 46. The panel 42 is then curved back to a substantially lateral inclined lower portion 45 forming the bottom 50 of the trough and continuing laterally toward sidewall 14 beyond the trough 46.

The panel 40, which extends laterally from the supply trough adjacent sidewall 14, also includes an upper portion 47 which is also inclined downwardly toward the trough 46. Panel 40 includes a terminal portion 49 curved downwardly from the upper portion 47 to form the opposite side 52 of the trough 46. Panel 40 terminates in a spaced relationship above the trough bottom 50 so as to form a trough orifice or outlet opening 54 extending longitudinally along one side of the trough 46.

In operation, the two supply troughs 44 are filled with water to the point of overflowing to provide a sheet of water flowing laterally from the supply troughs 44 across the top of upper portions 41 and 47 of panels 42 and 40 respectively, into the center trough 46. The water flows out of the trough 46 through the outlet 54 at the bottom of the trough and across the top of the lower portion 45 of the panel 42. A movable gate 64 on the outlet 54 is used to adjust the size of the outlet 54. The bottom outlet 54 allows any debris in scrubber that sinks in the water to flow through the scrubber rather than collect in the bottom of the trough.

A baffle 58 blocks the flow of water along the lower portion of the panel 42 beyond the outlet 54. Water flowing from the trough strikes the baffle 58 creating turbulence in the water to ensure sufficient mixing of the water and air to entrap all of the paint particles from the air in the water. Most of the water flowing from the trough will flow upwardly over the top of the baffle 58. The top of the baffle is disposed at a vertical height above the trough outlet 54 so as to form a water trap. The lower end of the baffle is spaced slightly above the panel 42 to also allow any debris in the water that will not float to flow through the scrubber without being trapped by the baffle. The lower edge of the baffle includes a moveable gate 60 which can be used to adjust the height of the lower edge of the baffle above the panel 42. Likewise, the baffle includes a gate 62 along its upper edge to adjust the vertical height of the baffle and the depth of the trap.

The terminal end 66 of the panel 42 is vertically spaced above a channel 68 in the base 20 so as to provide a cascade of water from the panel 42 downward into the channel 68. The paint laden water is collected in the channel 68 and conveyed to a sludge or water filtration system where the paint particles are removed from the water for proper disposal or recycling and the water is purified for either release to the environment or recycling through a closed loop system back to the scrubber.

The space below the inclined panels 40 and 42 is in communication with a vacuum source (not shown) through the outlet 70 in the sidewall 16. Air is forced downward through the scrubber and is drawn through the outlet 70 from the scrubber. The air drawn through the outlet 70 has passed through the scrubber and the cascading water. The air has been intermixed with the flowing water to remove substantially all of the paint particles from the air and entrap the paint in the water.

The fluid wash scrubber is configured so as to provide a substantially horizontal liquid flow while mixing the liquid with air to remove paint particles from the air. By doing so, the vertical height of the scrubber is reduced, enabling the overall height of the paint booth to be reduced or enabling the height of the upper chamber 24 to be increased to accommodate larger articles without increasing the overall height of the spray booth.

It is to be understood that the invention is not limited to the exact construction illustrated and described above, but that various changes and modifications may be made without departing from the spirit and scope of the invention as defined in the following claims.

What is claimed is:

1. A paint spray booth for painting articles comprising:
    a housing formed by longitudinally extending parallel sidewalls, a ceiling and a base;
    a substantially horizontal floor intermediate said base and ceiling forming an upper chamber and a lower chamber within said housing, said floor enabling flow of air therethrough between said chambers, and articles to be painted in said booth being conveyed longitudinally through said upper housing;
    ventilation mans for producing downwardly flowing air within said upper chamber to carry overspray paint particles from said upper chamber through said floor into said lower chamber;
    liquid wash scrubber means within said lower chamber for inducing mixture of said downwardly flowing air and a liquid to entrap the paint within the liquid to purify the air, said scrubber means including means forming two laterally flowing liquid streams from each of said sidewalls to a center trough, means forming a longitudinally extending side exit from said trough and a lateral flow path for liquid from said exit means, and wall means spaced above the bottom of said flow path downstream from said exit means forming liquid flow passages below and above said wall means to create turbulence in said liquid.

2. The spray booth of claim 1 further comprising adjustable gate means for varying the size of said trough exit to vary the liquid flow rate from said trough.

3. The spray booth of claim 1 further comprising adjustable gate means for adjusting the space between said wall means and the bottom of said lateral flow path.

4. The spray booth of claim 1 further comprising adjustable gate means for adjusting the height of said wall means.

5. The spray booth of claim 1 further comprising vacuum means in communication with said lower chamber for drawing air through said trough exit means to intermix said air with said liquid.

6. A paint spray booth for painting articles comprising:
 a housing formed by longitudinally extending parallel sidewalls, a ceiling and a base;
 a substantially horizontal floor intermediate said base and ceiling forming an upper chamber and a lower chamber within said housing, said floor enabling flow of air therethrough between said chambers, articles to be painted in said booth being conveyed longitudinally through said upper housing;
 ventilation means for producing downwardly flowing air within said upper chamber to carry overspray paint particles from said upper chamber through said floor into said lower chamber;
 liquid wash scrubber means within said lower chamber for inducing mixture of said downwardly flowing air and a liquid to entrap the paint particles within the liquid to purify the air, said scrubber means including a pair of longitudinal panels extending laterally inwardly and downwardly from opposite sidewalls and forming a central trough extending longitudinally through said lower chamber;
 one of said panels having an upper portion between said sidewall and said trough, an integrally formed intermediate portion forming one side of said trough and an integrally formed lower portion forming a bottom of said trough and extending laterally beyond said trough toward the opposite sidewall and terminating in spaced relationship thereto;
 the other of said panels having an upper portion between the opposite sidewall and said trough which is substantially identical to the upper portion of said one of said pair of panels, and an integrally formed terminal portion forming a second side of said trough opposite said first trough side, said terminal portion terminating in spaced relation relative to said trough bottom to form a lateral trough outlet at the bottom of said trough extending longitudinally along said second side of the trough;
 a wall extending longitudinally parallel to said trough, said wall disposed above said first panel lower portion forming liquid flow passages below and above said wall to create turbulence in said liquid; and
 vacuum means in communication with said lower chamber beneath said first panel for drawing air through said trough so as to intermix said air with the liquid.

7. The spray booth of claim 6 wherein said first panel lower portion terminates in vertically spaced relation above said base so as to form a cascade of liquid from said first panel to said base.

8. The spray booth of claim 7 wherein said vacuum means draws air through the cascading liquid.

9. The spray booth of claim 6 further comprising a vertically moveable gate mounted to the end of said second panel to vary the size of said trough outlet.

10. The spray booth of claim 6 further comprising a moveable gate disposed along the lower edge of said wall to vary the vertical spacing between said wall and said first panel lower portion.

11. The spray booth of claim 6 further comprising a moveable gate disposed along the upper end of said wall so as to enable adjustment of the vertical height of said wall.

* * * * *

UNITED STATES PATENT AND TRADEMARK OFFICE
CERTIFICATE OF CORRECTION

PATENT NO. : 5,040,482

DATED : August 20, 1991

INVENTOR(S) : McGuire et al.

It is certified that error appears in the above-identified patent and that said Letters Patent is hereby corrected as shown below:

Column 4, line 46, Claim 1,

After ventilation, please change "mans" to --means--.

Signed and Sealed this

Thirtieth Day of March, 1993

Attest:

STEPHEN G. KUNIN

*Attesting Officer*     *Acting Commissioner of Patents and Trademarks*